United States Patent
Jones et al.

(10) Patent No.: US 10,289,976 B2
(45) Date of Patent: May 14, 2019

(54) METHODS AND SYSTEMS FOR MANAGING STOCK ROOM BIN AUDITS AT RETAIL SALES FACILITIES

(71) Applicant: Walmart Apollo, LLC, Bentonville, AR (US)

(72) Inventors: Nicholaus A. Jones, Fayetteville, AR (US); Robert J. Taylor, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 118 days.

(21) Appl. No.: 15/342,430

(22) Filed: Nov. 3, 2016

(65) Prior Publication Data
US 2017/0132560 A1 May 11, 2017

Related U.S. Application Data

(60) Provisional application No. 62/251,522, filed on Nov. 5, 2015.

(51) Int. Cl.
*G06Q 10/08* (2012.01)

(52) U.S. Cl.
CPC ................. *G06Q 10/087* (2013.01)

(58) Field of Classification Search
CPC .................................................. G06Q 10/087
See application file for complete search history.

(56) References Cited

U.S. PATENT DOCUMENTS

| 5,940,808 | A | * | 8/1999 | Joseph | G06Q 10/087 705/28 |
|---|---|---|---|---|---|
| 7,092,929 | B1 | | 8/2006 | Dvorak | |
| 7,124,941 | B1 | | 10/2006 | O'Connell | |
| 7,347,361 | B2 | | 3/2008 | Lovett | |
| 7,543,741 | B2 | | 6/2009 | Lovett | |
| 7,810,720 | B2 | | 10/2010 | Lovett | |
| 8,321,302 | B2 | * | 11/2012 | Bauer | G06K 7/0008 705/22 |

(Continued)

OTHER PUBLICATIONS

"A Practical Guide to Risk Assessment"; Price Water House Coopers; Dec. 2008; 40 pgs.

(Continued)

*Primary Examiner* — Nathan A Mitchell
(74) *Attorney, Agent, or Firm* — Fitch, Even, Tabin & Flannery LLP (57) ABSTRACT

In some embodiments, methods and systems of managing bins audits in a stock room of a retail sales facility include generating at least one bin audit management factor for the bins at the retail sales facility. The bin audit management factor can include an amount of time a total number of products stored in the bin does not change; a number of times a one product is binned or picked from the bin, a number of products stored in the bin; and an accuracy percentage of a worker at the retail sales facility during a preceding audit of the bin. Based on whether the value of one or more of the bin audit management factors meets a predetermined threshold value that supports the auditing of a bin, an indication to a worker at the retail sales facility is generated as to whether that bin is to be audited or not.

14 Claims, 4 Drawing Sheets

(56) References Cited

U.S. PATENT DOCUMENTS

| | | | | |
|---|---|---|---|---|
| 8,346,630 B1* | 1/2013 | McKeown | ............ | G06Q 10/087 705/22 |
| 8,762,212 B2 | 6/2014 | Falls | | |
| 8,781,885 B2 | 7/2014 | Johnson | | |
| 8,965,796 B1* | 2/2015 | Gala | ............... | G06Q 20/203 705/28 |
| 9,827,683 B1* | 11/2017 | Hance | ................ | B25J 9/162 |
| 2003/0120563 A1* | 6/2003 | Meyer | .............. | G06Q 10/087 705/28 |
| 2003/0154141 A1* | 8/2003 | Capazario | ........... | G06Q 10/087 705/26.1 |
| 2003/0216969 A1* | 11/2003 | Bauer | ................ | G06K 7/0008 705/22 |
| 2006/0049251 A1* | 3/2006 | Zimet | ................. | G06Q 10/087 235/385 |
| 2006/0178953 A1* | 8/2006 | Aggarwal | ........... | G06Q 10/063 705/28 |
| 2006/0178954 A1* | 8/2006 | Thukral | ............. | G06Q 10/087 705/28 |
| 2007/0203811 A1* | 8/2007 | Hoopes | ............... | G06Q 10/087 705/28 |
| 2007/0262142 A1* | 11/2007 | Whitehouse | ......... | G06Q 10/087 235/385 |
| 2008/0027835 A1* | 1/2008 | LeMasters | .......... | G06Q 10/087 705/28 |
| 2008/0120205 A1* | 5/2008 | Hoopes | ............... | G06Q 10/087 705/28 |
| 2008/0270269 A1* | 10/2008 | Myers | ................ | G06Q 10/087 705/28 |
| 2008/0294996 A1 | 11/2008 | Hunt | | |
| 2012/0019399 A1* | 1/2012 | Vargo | ................. | G06K 7/0008 340/870.11 |
| 2014/0316951 A1* | 10/2014 | Rimnac | ............... | G06Q 10/087 705/28 |
| 2014/0379535 A1* | 12/2014 | Briet | ................. | G06Q 30/0201 705/28 |
| 2015/0127414 A1* | 5/2015 | Geffert | ............. | G06Q 10/0635 705/7.28 |
| 2015/0154956 A1* | 6/2015 | Brown | ................ | G10L 15/26 704/235 |
| 2016/0022218 A1* | 1/2016 | Hayes | ................. | A61G 7/005 600/301 |
| 2016/0225045 A1* | 8/2016 | Cumberland | ...... | G06Q 30/0605 |
| 2017/0161675 A1* | 6/2017 | Jones | ................. | G06Q 10/087 |
| 2018/0005174 A1* | 1/2018 | Dixon | ................. | G06Q 10/087 |

OTHER PUBLICATIONS

"Factory Audit Management"; http://www.metricstream.com/solution_briefs/factoryauditmanagement.htm; Aug. 19, 2015; 7 pgs.

Algara, et al.; "5 Ways Business Intelligence Can Enhance Inventory Managment"; http://www.beyenetwork.com/view/8599; Aug. 9, 2015; 3 pgs.

* cited by examiner

METHODS AND SYSTEMS FOR MANAGING STOCK ROOM BIN AUDITS AT RETAIL SALES FACILITIES

RELATED APPLICATIONS

This application claims the benefit of U.S. Provisional Application No. 62/251,522, filed Nov. 5, 2015, which is incorporated herein by reference in its entirety.

TECHNICAL FIELD

This invention relates generally to managing stock room inventory and, in particular, to systems and methods for managing bin audits in stock rooms of retail sales facilities.

BACKGROUND

Retail sales facilities such as large department stores typically store overstock products in storage bins located in their stock rooms. A stock room of a retail sales facility may store hundreds, if not thousands of bins, and each storage bin may in turn contain dozens, hundreds, or thousands of products. Since products are binned into the bins after a delivery and picked from the bins to be worked to the sales floor frequently, in order to accurately monitor the on-hand product inventory at a retail sales facility, the associates at the retail sales facility periodically audit the storage bins in the stock room to determine that the bins actually contain the products indicated in the inventory system to be located in those bins. Such bin auditing generally requires an associate to manually scan each of the products in the bin using a hand-held scanner.

Given the large number of products stored in the bins in a stock room of a retail sales facility, bin auditing is a time consuming and voluminous task that increases the operational costs of the retail sales facility. Since the workers at retail sales facilities may have to scan dozens, hundreds, or thousands of products in the bins of the stock rooms when auditing the bins, the likelihood of human error during data entry increases, sometimes leading to inaccurate stocking information and the resulting inefficiencies during subsequent retrieval of products from the bins.

BRIEF DESCRIPTION OF THE DRAWINGS

Disclosed herein are embodiments of systems, apparatuses and methods pertaining to methods and systems for managing stock room bin audits at retail sales facilities. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally, this application describes systems and methods of managing bins audits in a stock room of a retail sales facility based on at least one bin audit management factor for the bins at the retail sales facility. The bin audit management factors that may be factored in when arriving at a decision of whether a bin is to be audited can include but are not limited to: an amount of time a total number of products stored in the bin does not change; a number of times a product is binned into or picked from the bin; a number of products stored in the bin; and an accuracy percentage of a worker at the retail sales facility during a preceding audit of the bin. If the value of one or more of the bin audit management factors meets a predetermined threshold value that supports the auditing of a bin, an indication is generated for a worker at the retail sales facility to audit the bin. Conversely, if the value of one or more of the bin audit management factors does not meet a predetermined threshold value that supports the auditing of a bin, no such indication to audit is generated and the worker may be restricted from auditing the bin.

In one embodiment, a method of managing a number of audits of bins storing products at a stock room location of a retail sales facility includes: generating, using an electronic inventory management device including a processor, at least one bin audit management factor for at least one bin at the retail sales facility. The at least one bin audit management factor includes but is not limited to: an amount of time a total number of products stored in the at least one bin does not change; a number of times at least one product is binned or picked from the at least one bin, a number of products stored in the at least one bin; and an accuracy percentage of a worker at the retail sales facility during a preceding audit of the at least one bin. The method further includes obtaining, using the electronic inventory management device, the at least one bin audit management factor for the at least one bin and determining whether at least one threshold value for the obtained at least one bin audit management factor meets a predetermined threshold value that supports auditing the at least one bin; and generating, using the electronic inventory management device, an indication to the worker at the retail sales facility whether the determining step supports the auditing of the at least one bin.

In another embodiment, a system for managing a number of audits of bins storing products at a stock room location of a retail sales facility includes a database configured to store at least one bin audit management factor for at least one bin at the retail sales facility and an electronic inventory management device including a control unit having a processor in communication with the database. The control unit is configured to: generate at least one bin audit management factor for at least one bin at the retail sales facility, wherein the at least one bin audit management factor comprises at least one of: an amount of time a total number of products stored in the at least one bin does not change; a number of times at least one product is binned or picked from the at least one bin, a number of products stored in the at least one bin; and an accuracy percentage of a worker at the retail sales facility during a preceding audit of the at least one bin; obtain, the at least one bin audit management factor for the at least one bin and determine whether at least one threshold value for the obtained at least one bin audit management factor meets a predetermined threshold value that supports auditing the at least one bin; and generate an indication to the worker at the retail sales facility whether the determination supports the auditing of the at least one bin.

In yet another embodiment, a system of managing a number of audits of bins storing products at a stock room location of a retail sales facility includes means for generating, using an electronic inventory management device including a processor, at least one bin audit management factor for at least one bin at the retail sales facility. The at least one bin audit management factor comprises at least one of: an amount of time a total number of products stored in the at least one bin does not change; a number of times at least one product is binned or picked from the at least one bin, a number of products stored in the at least one bin; and an accuracy percentage of a worker at the retail sales facility during a preceding audit of the at least one bin. The system further includes means for obtaining, using the electronic inventory management device, the at least one bin audit management factor for the at least one bin and determining whether at least one threshold value for the obtained at least one bin audit management factor meets a predetermined threshold value that supports auditing the at least one bin; and means for generating, using the electronic inventory management device, an indication to the worker at the retail sales facility whether the determining step supports the auditing of the at least one bin.

Figure 1:
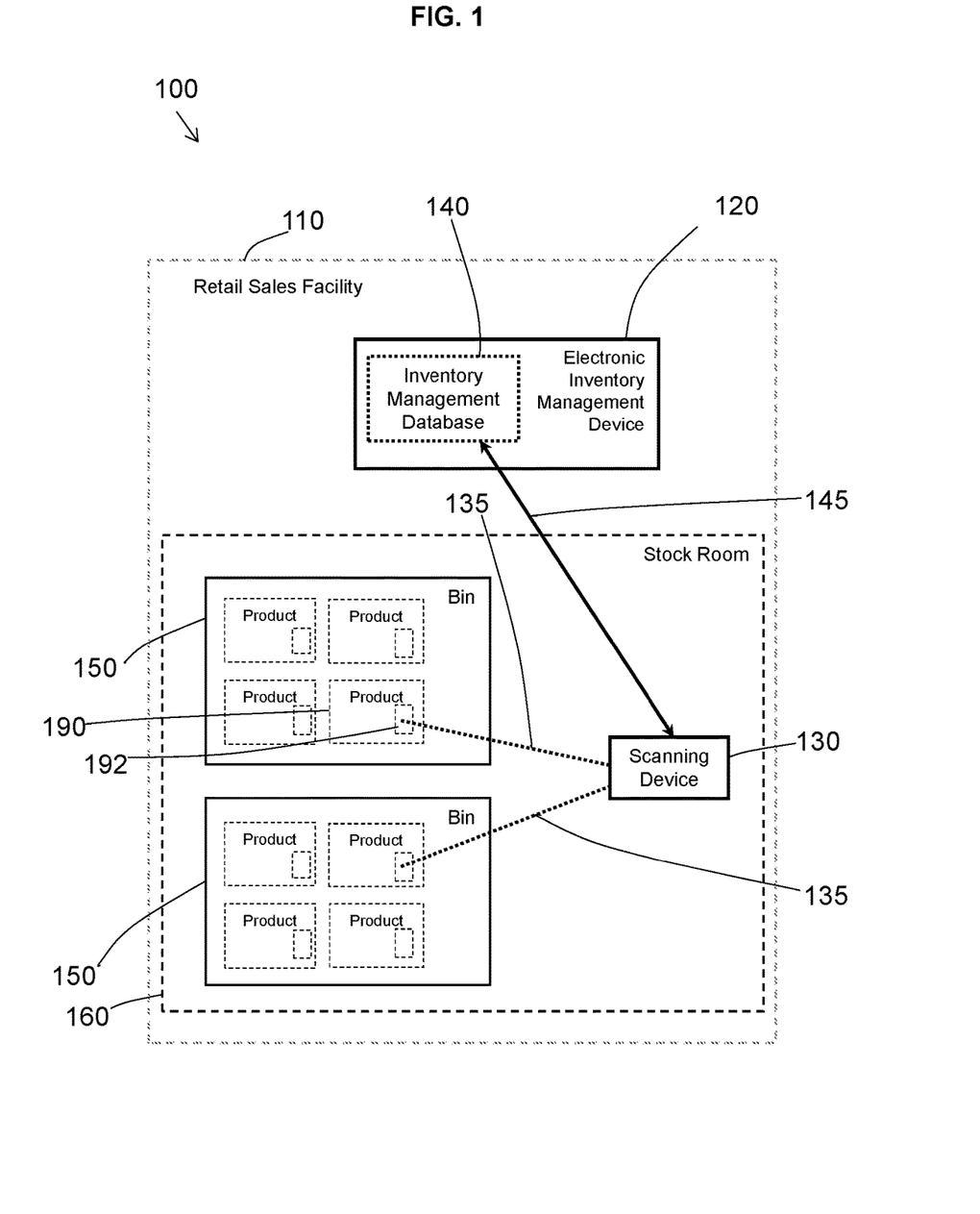
FIG. 1 is a diagram of a system of managing stock room bin audits at a retail sales facility in accordance with some embodiments.

Referring to FIG. 1, one embodiment of a system 100 for managing audits of products 190 stored in storage bins 150 at a stock room 160 of a retail sales facility 110 is shown. The retail sales facility 110 may be any place of business such as a store or warehouse where products 190 are stocked and/or sold to consumers. While only two storage bins 150 each housing four products 190 are shown in FIG. 1 for ease of illustration, it will be appreciated that the stock room 160 of the retail sales facility 110 may store numerous (e.g., tens, hundreds, and/or thousands) of bins 150, and that each bin 150 may contain dozens or hundreds of products 190.

The exemplary system 100 depicted in FIG. 1 includes an electronic inventory management device 120 configured generally to manage the inventory of products 190 at the retail sales facility 110, and more specifically, to manage the auditing of the bins 150. The electronic inventory management device 120 illustrated in FIG. 1 may be a stationary or portable electronic device including a processor-based control unit, for example, a desktop computer, a laptop computer, a tablet, a mobile phone, or any other electronic device configured for data entry and one-way and/or two-way communication with another device located at the retail sales facility 110 (e.g., scanning device 130), or at a location remote to the retail sales facility 110 (e.g., a regional server configured for two-way communication with electronic inventory management devices 120 located at multiple retail sales facilities 110).

The exemplary electronic inventory management device 120 shown in FIG. 1 includes an inventory management database 140 configured to store electronic information regarding the products 190 at the retail sales facility 110. The inventory management database 140 may store electronic data including but not limited to: historical data derived from transaction data pertaining to the products (i.e., product purchases), inventory stocking data such as time stamp of binning of a product 190, time stamp of a pick of a product from a bin 150, time stamp of an audit of a bin 150, number of products 190 delivered to the retail sales facility 110 and/or sold at the retail sales facility 110 within a predetermined interval or time. The inventory management database 140 may be stored, for example, on non-volatile storage media (e.g., a hard drive, flash drive, or removable optical disk) internal or external relative to the electronic inventory management device 120, or internal or external to computing devices (e.g., remote server) separate from the electronic inventory management device 120.

In some embodiments, the inventory management database 140 may store electronic data in the form of inventory management factors pertaining to the bins 150 in the stock room 160 of the retail sales facility 110. Such inventory management factors may include but are not limited to: number of products 190 in each bin 150; time stamp and the associated amount of time elapsed since a bin 150 has been audited; time stamp and the associated amount of time elapsed since a product 190 was binned into or picked from a bin 150; total number of products 190 in the bin 150; total number of times one or more products 190 are binned into or picked from one or more bins 190; and, for bins that have previously been audited by a worker, an accuracy percentage of a worker at the retail sales facility 110 during a preceding audit of the bins 150. In some embodiments, the inventory management factors may vary based on whether the products 190 in the bin 150 are stored as eaches, cases, or pallets.

The electronic data stored in the inventory management database 140 of the electronic inventory management device 120 may be received by the electronic inventory management device 120, for example, as a result of a worker (e.g., stock room associate) scanning the products 190 using the scanning device 130, for example when binning a product 190 into a bin 150, when picking a product 190 from the bin 150, or when auditing a bin 150. In some embodiments, at least some of the electronic data representing one or more bin audit management factors may be transmitted to the electronic inventory management device 120 from a remote (e.g., regional) server. By way of example, information regarding worker accuracy during previous bin audits may be received by the electronic inventory management device 120 from a server located at a product distribution center or a server at a regional data center. It will be appreciated that the inventory management database 140 does not have to be incorporated into the electronic inventory management device 120 as shown in FIG. 1, but may be stored on a remote (e.g., regional) server in communication with the electronic inventory management device 120.

The scanning device 130 may be an electronic mobile (e.g., hand-held) scanner that may be carried by a worker at the retail sales facility 110. Examples of such scanning devices 130 may include, but are not limited to barcode, RFID, or SKU readers, electronic tablets, cellular phones, or the like. Alternatively, the scanning device 130 may be a stationary electronic scanning device installed in the stock room 160 of the retail sales facility 110.

In the exemplary embodiment illustrated in FIG. 1, the scanning device 130 may obtain electronic data (e.g., identifying data) associated with a product 190 in a bin 150 by communicating via a communication channel 135 (e.g., radio waves) with a unique identifying indicia 192 (e.g., barcode, RFID (radio frequency identification), or SKU (stock keeping unit) number) of the product 190. The electronic inventory management device 120 of FIG. 1 may receive the electronic data associated with the product 190 from the scanning device 130 by way of a two-way communication channel 145, which may be a wired or wireless connection (e.g., WiFi). For example, when a worker bins a product 190 into a bin 150 in the stock room 160 of the retail sales facility 110, the worker may scan the identifying indicia 192 of the product 190 being binned using the scanning device 130, in response to which data uniquely identifying the product 190 may be obtained by the scanning device 130, and a time stamp of binning of the product 190 may be generated by the scanning device 130.

Figure 2:
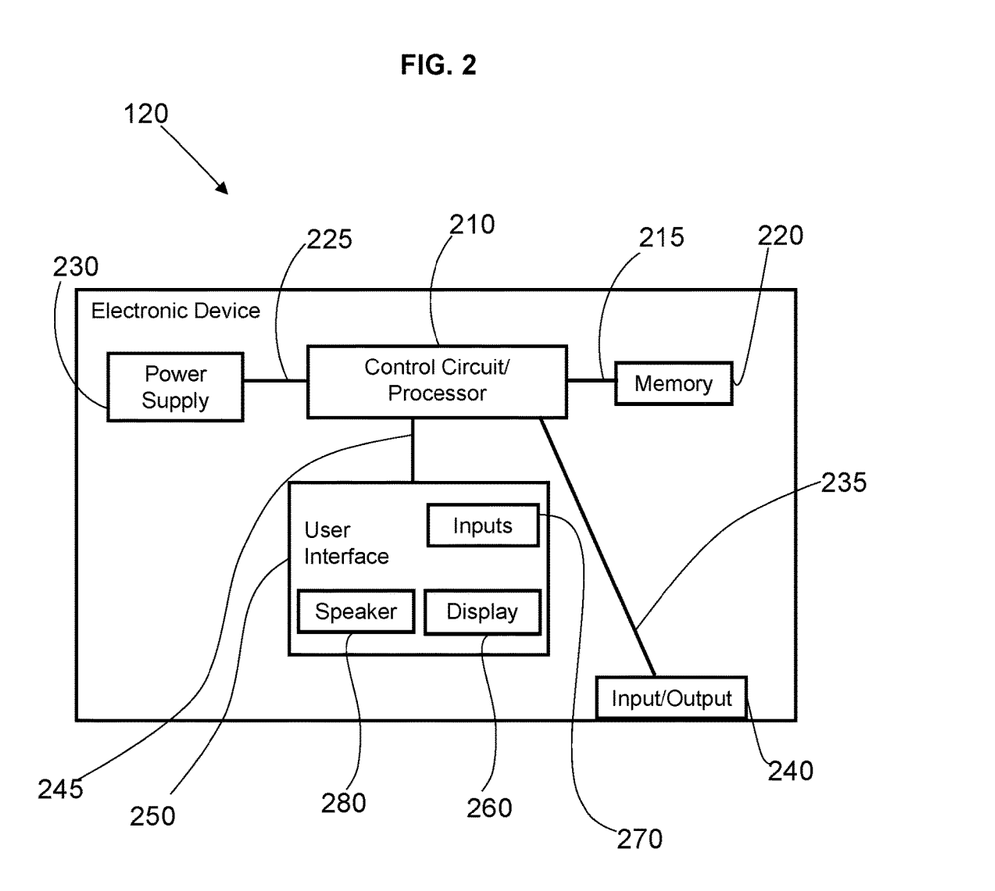
FIG. 2 is a functional diagram of an electronic inventory management device in accordance with several embodiments.

An exemplary electronic inventory management device 120 depicted in FIG. 2 is a computer-based device and includes a control circuit (i.e., control unit) 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit (i.e., control unit) 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)). Accordingly, the memory and/or the control unit may be referred to as a non-transitory medium or non-transitory computer readable medium. The control unit 210 of the electronic inventory management device 120 is also electrically coupled via a connection 235 to an input/output 240 that can receive signals from and send signals (via a wired or wireless connection) to (e.g., commands, inventory database information), for example, devices local to the retail sales facility 110, or one or more servers remote to the retail sales facility 110.

Optionally, instead of receiving information regarding the products 190 from a separate scanner such as the scanning device 130, the control unit 210 may also be electrically coupled to a sensor such as a reader configured to detect and/or read information on the identifying indicia (e.g., a label) 192 located on the products 190 when the electronic inventory management device 120 is placed in direct proximity to a product 190. Such an optional reader may be a radio frequency identification (RFID) reader, an optical reader, a barcode reader, or the like.

In the embodiment shown in FIG. 2, the processor-based control unit 210 of the electronic inventory management device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the electronic inventory management device 120 by inputting commands, for example, via touch-screen and/or button operation or voice commands. The display screen 260 can also permit the user to see various menus, options, and/or alerts displayed by the electronic inventory management device 120. The user interface 250 of the electronic inventory management device 120 may also include a speaker 280 that may provide audible feedback (e.g., alerts) to the user.

Figure 3:
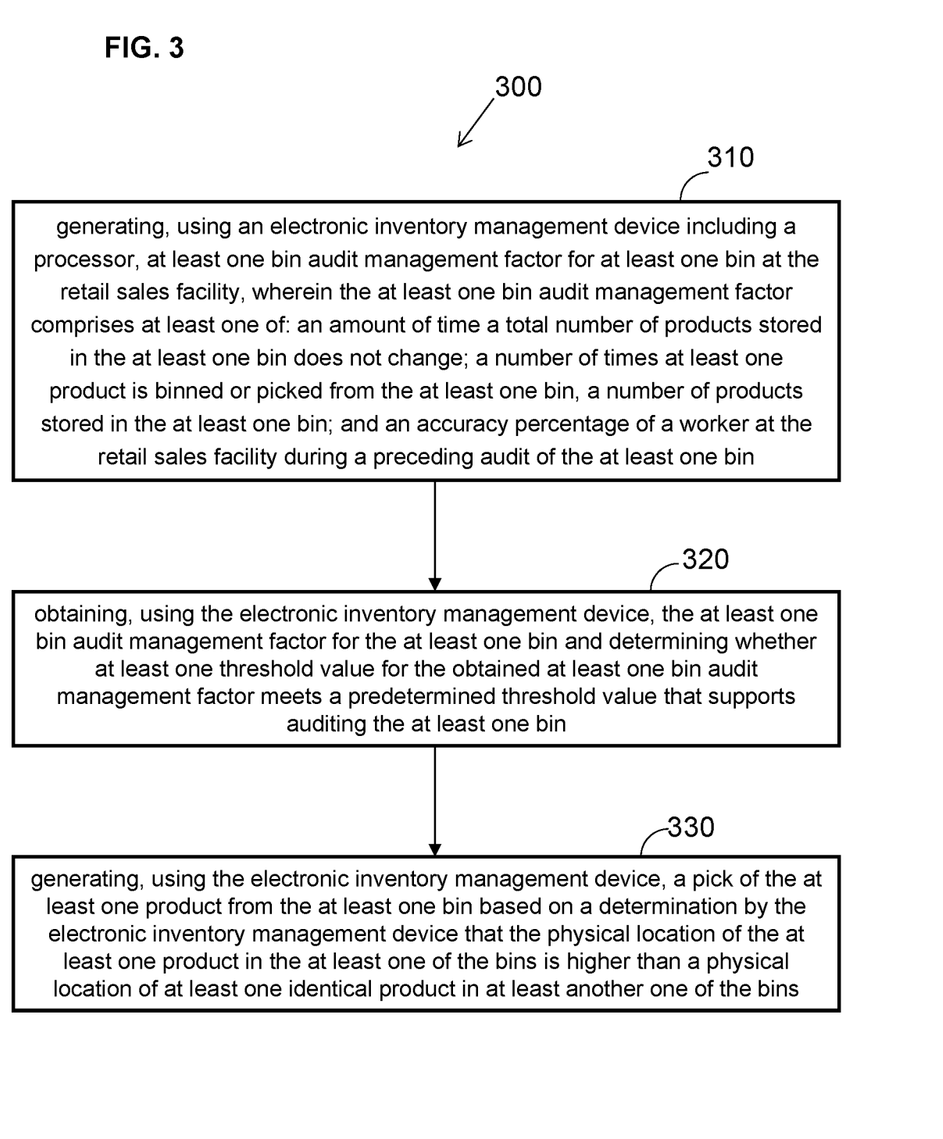
FIG. 3 is a flow diagram of a process of managing stock room bin audits at a retail sales facility in accordance with some embodiments.

With reference to FIGS. 1-3, one method 300 of operation of the system 100 for managing the audits of bins 150 in a stock room 160 of a retail sales facility 110 will now be described. For exemplary purposes, the method 300 is described in the context of the system of FIG. 1, but it is understood that embodiments of the method 300 may be implemented in the system 100 or other systems. Generally, as shown in FIG. 3, the method 300 includes generating, using the electronic inventory management device 120, at least one bin audit management factor for one or more bins 150 at the retail sales facility 110 (step 310).

In some embodiments, the inventory management factors that may be factored in by the processor of the control unit 210 of the electronic inventory management device 120 to determine whether the bin 150 is to be audited by a worker at the retail sales facility 110 include, but are not limited to: an amount of time a total number of products 190 stored in a bin 150 does not change (i.e., no products 190 are binned into or picked from the bin 150 and/or the bin has not been audited in a predetermined interval of time); a number of times a product 190 is binned into or picked from the bin 150; a total number of products 190 stored in the bin 150; and an accuracy percentage of the worker at the retail sales facility 110 during a preceding audit of the bin 150. It will be appreciated that the above bin audit management factors are shown by way of example only, and that both additional and alternative bin audit management factors may be factored in by the processor or the control unit 210 of the electronic inventory management device 120 to determine whether a bin 150 is to be audited or not. In the exemplary embodiment illustrated in FIG. 1, the generated bin audit management factors are stored in the inventory management database 140 of the electronic inventory management device 120, but it will be appreciated that the bin audit management factors, after being generated by the electronic inventory management device 120, may be transmitted to a database server remote to the retail sales facility 110.

In some embodiments, after the stocking associate at the retail sales facility 110 scans the identifying indicia 192 of the product 190 using the scanning device 130 (e.g., when binning the product 190 or picking the product 190), the scanning device 130 transmits a signal including electronic data associated with the product 190, for example, a unique identifier of the product 190 and a time stamp of binning of the product 190 into the bin 150, to the electronic inventory management device 120. After receiving electronic data associated with the product 190, the processor of the control unit 210 of the electronic inventory management device 120 is programmed to send a signal to the inventory management database 140 to enable the inventory management database 140 to be updated with the electronic data associated with the product 190. It will be appreciated that instead of transmitting the electronic data associated with the product 190 to the electronic inventory management device 120 directly, the scanning device 130 may transmit the data obtained based on scanning the product 190 to a remote inventory management database (e.g., regional data bank) located at a server remote to the retail sales facility 110.

In the exemplary method 300 illustrated in FIG. 3, the control unit 210 of the electronic inventory management device 120 is programmed to obtain one or more of the bin audit management factors associated with a bin 150 of interest (step 320). The bin audit management factors may be manually entered by a worker into the electronic inventory management device 120, or may be generated by the control unit 210 based on various variable and historical data associated with the bins 150 and products 190 at a retail sales facility.

The bin audit management factors, once entered by a worker or generated by the control unit 210 for the bins 150 in the stock room 160 of the retail sales facility 110, may be stored in the inventory management database 140 of the electronic inventory management device 120, or may be stored on a remote server in wired or wireless communication with the electronic inventory management device 120. When a bin 150 for which the bin audit management factors are to be obtained is determined by the electronic inventory management device 120 (e.g., as a result of manual input by a worker), the control unit 210 is programmed to send a signal including a request for one or more bin audit management factors associated with that bin 150 to be retrieved either from the inventory management database 140 or from the remote (e.g., regional) inventory management database and to be transmitted to the control unit 210 accordingly.

The control unit 210 of the electronic inventory management device 120 is programmed to set a threshold value for each of the bin audit management factors based on various criteria including but not limited to the size of the bin 150, consumer demand for products 190 at the retail sales facility 110, worker availability and accuracy at the retail sales facility 110. The thresholds for the bin audit management factors may be manually entered by a worker at the retail sales facility 110 into the electronic inventory management device 120, or may be obtained by the electronic inventory management device 120 from a server remote to the electronic inventory management device 120 (e.g., regional server). Some exemplary threshold values for bins 150 according to one embodiment will be discussed below with reference to FIG. 4.

In some embodiments, the control unit 210 of the electronic inventory management device 120 may set the threshold for supporting the auditing of a bin 150 based on whether the products 190 stored in the bin 150 are stored as pallets, cases, or eaches. The varying threshold values for bins 150 storing eaches, cases, and pallets are a result of the bins 150 storing products 120 as eaches containing significantly more individual units than bins 150 that contain cases of the product 120, which in turn contain a number of cases that is significantly higher than the number of (the much larger) pallets in a bin 150 that contains pallets.

In some embodiments, the control unit 210 may include smart logic (e.g., learning function) in that the control unit 210 is programmed to adjust the preset threshold value of one or more bin audit management factors for a bin 150 based on at least one previous auditing of the bin 150. For example, if the control unit 210 of the electronic inventory management device 120 receives an indication that worker accuracy was significantly higher or lower during the preceding audit of a bin 150, the control unit 210 may adjust the bin audit management factor relating to worker accuracy accordingly. As such, the control unit 210 is configured to set bin audit management factor thresholds based on updated real-time information, thereby increasing the accuracy of the preset thresholds of bin audit management factors for the bins 150 at specific retail sales facilities 110. In the exemplary embodiment of FIG. 3, after the one or more bin audit management factors are obtained, the control unit 210 of the electronic inventory management device 120 is programmed to determine whether a threshold value for each of the obtained one or more bin audit management factors meets a predetermined threshold value that supports the auditing of the bin 150 (step 320).

In some embodiments, a determination of whether or not a bin 150 is to be audited by the control unit 210 depends on a number of bin audit management factors for which the predetermined threshold is exceeded. For example, the control unit 210 may generate an indication to the worker at the retail sales facility 110 that the obtained bin audit management factors support the auditing of the bin 150 in response to a determination that a single threshold value for the obtained bin audit management factors meet the predetermined threshold value that supports the auditing of the at least one bin. In other embodiments, the control unit 210 may generate an indication to the worker at the retail sales facility 110 that the obtained bin audit management factors support the auditing of the bin 150 in response to a determination that two or more threshold values for the obtained bin audit management factors meet the predetermined threshold value that supports the auditing of the at least one bin. In still other embodiments, the control unit 210 may generate an indication to the worker at the retail sales facility 110 that the obtained bin audit management factors support the auditing of the bin 150 in response to a determination that three or more threshold values for the obtained bin audit management factors meet the predetermined threshold value that supports the auditing of the at least one bin. In still other embodiments, the control unit 210 may generate an indication to the worker at the retail sales facility 110 that the obtained bin audit management factors support the auditing of the bin 150 in response to a determination that all of the threshold values for the obtained bin audit management factors meet the predetermined threshold value that supports the auditing of the at least one bin.

Generally, when the control unit 210 of the electronic inventory management device 120 determines that a value for one or more of the obtained bin management factors meets the value for the bin management factor stored in the inventory management database 140 of the electronic inventory management device 120, the control unit 210 of the electronic inventory management device 120 is programmed to generate an indication to the worker at the retail sales facility that the bin 150 of interest must be audited (step 330). Such an indication or output may be generated for a worker at the retail sales facility 110 on the visual display 260 of the electronic inventory management device 120, or via the speaker 280 of the electronic inventory management device 120. In some embodiments, the indication to the worker of whether to audit a bin 150 may be in the form of a list (e.g., a list of bins 150 to be audited).

Conversely, when the control unit 210 of the electronic inventory management device 120 determines that a value for one or more of the obtained bin management factors does not meet the value for the corresponding bin management factor thresholds stored in the inventory management database 140 of the electronic inventory management device 120, the control unit 210 of the electronic inventory management device 120 is programmed to generate an indication to the worker at the retail sales facility that the bin 150 of interest is not to be audited. For example, in some embodiments, when the threshold values for that bin 150 do not support the auditing of the at least one bin 150, the control unit 210 of the electronic inventory management device 120 is programmed to restrict the worker at the retail sales facility 110 from the auditing of the bin 150, for example, by way of sending a signal via the communication channel 145 to the scanning device 130 to disable the scanning of the products 190 in that bin 150.

Figure 4:
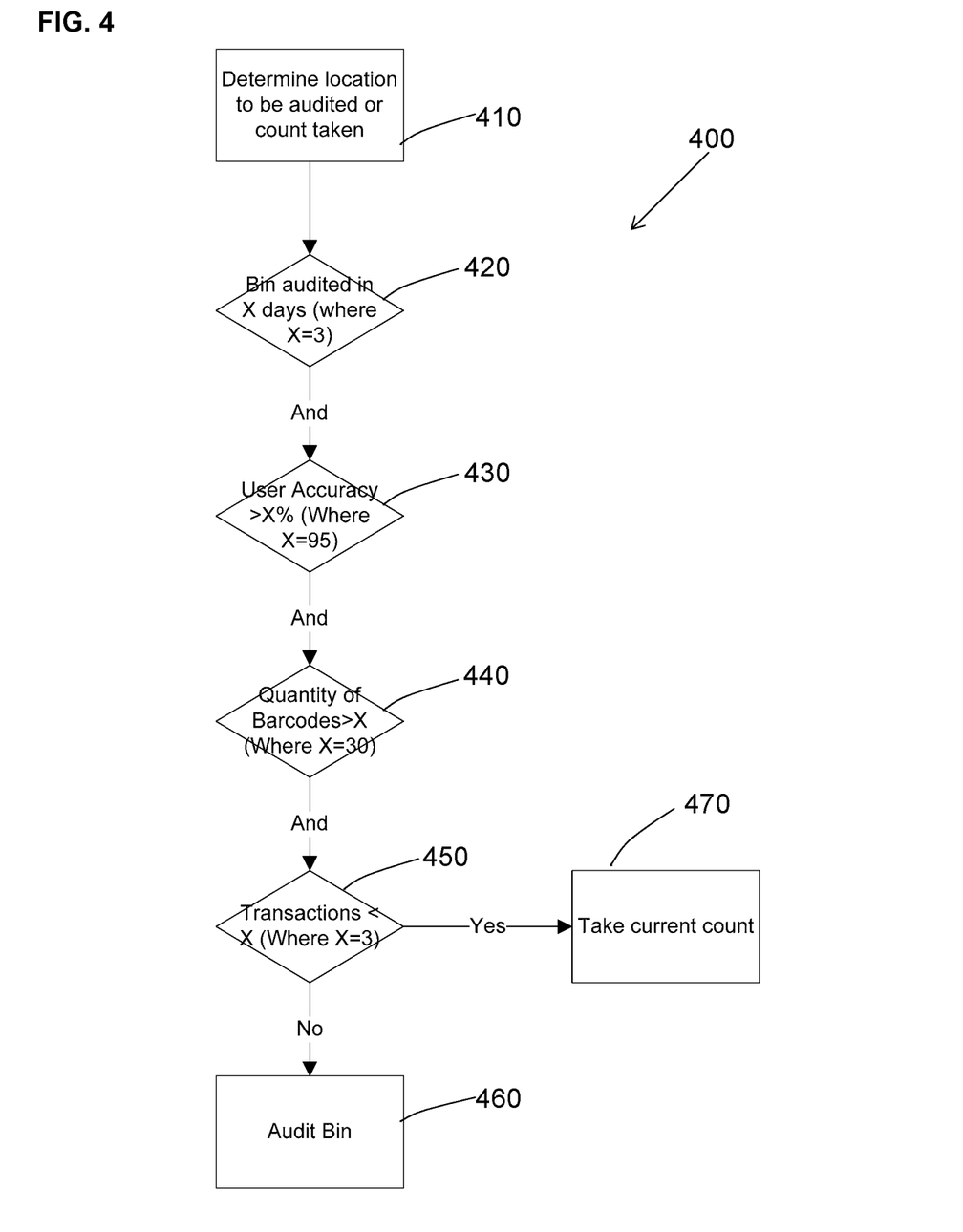
FIG. 4 is a flow diagram of a method of managing stock room bin audits at a retail sales facility in accordance with some embodiments.

FIG. 4 shows an exemplary method 400 of managing bin audits in a stock room 160 of a retail sales facility 110 in operation. In the method of FIG. 400, the control unit 210 of the electronic inventory management device 120 is programmed to determine a location (i.e., one or more bins 150) in a stock room 160 of the retail sales facility 110 to be audited (step 410). As described above, a purpose of a bin audit is to determine whether the products 190 indicated in the inventory management database 140 as being in a bin 150 are actually in that bin 150. In the exemplary method 400 of FIG. 4, the processor control unit 210 of the electronic inventory management device 120 is programmed to analyze the following four exemplary inventory management factors to arrive at a decision of whether to audit the bin 150 or not: amount of time (days) since the last audit of the bin 150; user accuracy percentage of the worker at the retail sales facility 110 during a preceding audit of the bin 150; a total number of products 190 stored in the bin 150; and number of transactions (i.e., binning of products 190 into the bin or picking of products 190 from the bin) that have occurred in the bin 190.

As shown in FIG. 4, the exemplary thresholds set by the control unit 210 of the electronic inventory management device 120 for the bin 150 are as follows: (1) up to 3 days of static activity (i.e., whether the bin has been audited in the past X number of days) (step 420), (2) 3 or fewer transactions in the bin 150 (binning of products 190 into the bin 150 and/or picks of products 190 from the bin 150) (step 450), (3) 30 or fewer barcodes (individual product, case, or pallet) (step 440); and (4) last audit user accuracy of above 95% (step 430). All discussed above, these predetermined thresholds may be adjusted by the control unit 210 based on learnings, and the bin audit management factors in FIG. 4 and their specific numerical values are shown by way of example only, and both additional and alternative bin audit management factors may be factored in by the processor or the control unit 210 of the electronic inventory management device 120 to determine whether a bin 150 is to be audited or not.

While FIG. 4 shows that the determination by the control unit 210 to audit the bin 150 (step 460) is generated based on all four of the values for the bin as compared to the predetermined thresholds support the audit of the bin 150, it will be appreciated that the determination to audit the bin 150 may be made based on only one, two, or three of the threshold values for the bin audit management factors meeting the predetermined threshold values for the bin 150 stored in the inventory management database 140. Conversely, if the obtained values for a bin 150 do not support the auditing of the bin 150 when compared to the predetermined threshold values stored in the inventory management database 140, the control unit 210 of the electronic inventory management device 120 may generate an indication to the worker at the retail sales facility 110 not to audit the bin but to take current count of the products 120 (step 470). In some embodiments, the indication to the worker of whether to audit a bin 150 may be in the form of a list of bins 150 to be audited, and the bins 150 determined (e.g., by the control unit 210 of the electronic inventory management device 120) to not be audited do not appear on such a list.

In some embodiments, the following exemplary probabilities may be factored in and processed by the control unit 210 of the electronic inventory management device 120 when determining whether a bin 150 should be audited or not:

Probability to audit a bin $$P_{Audit} = f(\text{Skus}) + f(A) + f(T) + f(R)$$

With $P_{Audit}$>a target value=bin location audit or with known weight or affect to accuracy $$P_{Audit} = \alpha f(\text{Skus}) + \beta f(A) + \gamma f(T) + \delta f(R)$$

Where $\alpha, \beta, \gamma, \delta < 1$

Time Factor: f(T)

$$f(T) = \left[\left(\frac{1}{t_{stop} - t_{start}}\right)T - \left(\frac{t_{start}}{t_{stop} - t_{start}}\right)\right]$$

If $f(T) < 0$, then $f(T) = 0$

If $f(T) > 1$, then $f(T) = 1$

Example: $t_{stop}=25$, $t_{start}=3$ f(T) prioritizes auditing for bins 150 not counted in the last 25 days and reduces the probability to count for subsequent days prior, down to a 0-probability at 3 days.

User accuracy Factor: f(A)

$$f(A) = 1 - \left(\frac{A}{R_{target}}\right)^X$$

If $f(A) < 0$, then $f(A) = 0$

Example: $R_{target}=95$ and X is 2 f(A) prioritizes high accuracy of associates not to contribute to the probability of having to audit the bin 150, described by a target ratio ($R_{target}$). In the exemplary embodiment of FIG. 4, the target ratio (i.e., predetermined threshold of worker accuracy during a preceding bin audit) is 95%. In other words, workers at retail sales facilities 110 with target ratios of 95% or greater will not contribute to the probability of having to audit a bin 150. X is the effect of the rate of change of the factor on overall probability to audit the bin 150.

Sku Factor: f(Skus)

$$f(Skus) = 1 - \left(\frac{Skus}{R_{target}}\right)^X$$

If $f(Skus) < 0$, then $f(Skus) = 0$

If $Skus > R_{target}$, then $f(Skus) = 1 - \left(\frac{Skus}{R_{target}}\right)^X \div 100$ Example: $R_{target}=30$ and X is 7 f(sku) prioritizes high numbers of skus (stock keeping units) in a bin 150 not to contribute to the probability of having to audit the bin 150, described by a target ratio ($R_{target}$). Bins 150 with target ratios of 30 SKUs or greater will not contribute to the probability of having to audit a bin 150, since locations with large numbers of SKUs are generally more difficult to audit accurately. Common large SKU bins 150 are considered to be each—containing bins and mixed pallet bins. X is the effect of the rate of change of the factor on overall probability to audit.

Transaction Factor: f(R)

$$f(T) = \frac{R}{\varepsilon}$$

If $f(R) < 0$, then $f(R) = 0$

If $f(R) > 1$, then $f(R) = 1$

Example: $\varepsilon=3$ f(R) prioritizes low numbers of transactions in a bin 150 (pick or bin or move a product 120 into or from the bin 150) not to contribute to the probability of having to audit the bin 150. Bins 150 having 3 or more transactions will contribute greater to the probability of having to audit the bin 150, since bins with a large number of transactions are considered to be more likely to have inaccuracies.

In one specific example, the control unit 210 of the electronic inventory management device 120 is programmed to have a threshold of 75%, such that the bin audit management factors would lean heavily toward user accuracy and number of transaction, which would reduce the overall number of times a bin 150 was audited. In such a situation, the control unit 210 of the electronic inventory management device 120 is programmed to calculate that, the above equation to determine a probability to audit the bin 150 (i.e., $P_{Audit}=\alpha f(Skus)+\beta f(A)+\gamma f(T)+\delta f(R)$), $\alpha$ would be low and have a weight of 10%, $\beta$ would have a weight of 40%, $\gamma$ would be 10%, and $\delta$ would be 40%.

If, after obtaining from the inventory management database 140, one or more bin audit management factors indicating that the bin 150 was audited 10 days ago, that the given user's accuracy is 95%, and that the number of SKUs in the bin 150 is 50, and that the number of transaction from that bin 150 is 20, the control unit 210 of the electronic inventory management device 120 is programmed to calculate, based on the above probability of audit equation that the probability to audit the bin 150 would be 50%, which would be determined by the control unit 210 to be below the preset threshold of 75%, and would cause the control unit 210 to arrive at a decision (and transmit an appropriate notification to the scanning device 130 of the user) that the bin 150 does not have to be audited. This is because of the bin audit management factors, i.e., the user accuracy (95%) and the number of transactions (20) processed by the control unit 210 of the electronic inventory management device 120, only one factor (i.e., number of transactions) leans toward auditing of the bin. In other words, if the bin 150 were audited by another worker having lower user accuracy (thereby leaning the second of the analyzed bin audit management factors toward bin audit), the control unit 120 of the electronic inventory management device 120 would be much more likely (depending on how much lower the user accuracy is) to arrive at a decision that the bin 150 does have to be audited. In the example above, if the probability to audit the bin 150 were calculated by the control unit 210 to be not 50%, but higher than the threshold value of 75%, the control unit 210 would arrive at a decision (and transmit an appropriate notification to the scanning device 130 of the user) that the bin 150 should be audited The systems and methods described herein analyze bin management factors and predetermined bin management factor thresholds to determine whether to audit a bin in a stock room or not, thereby restricting bin audits in certain appropriate situations. Such by controlling and reducing the number of bin audits at retail sales facilities advantageously increases efficiency of workers in stock rooms of retail sales facilities and advantageously reduces both worker time spent on bin audits that may not have been needed and potential for user error associated with bin audit scanning of a large number of products by the workers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of managing a number of audits of bins storing products at a stock room location of a retail sales facility, the method comprising:

providing a mobile electronic device of a worker, the mobile electronic device including at least one of a display, a speaker, and a scanner configured to scan identifying indicia of the products at the stock room location of the retail sales facility;

generating, using an electronic inventory management device including a processor, at least one bin audit management factor for at least one bin at the retail sales facility, wherein the at least one bin audit management factor comprises at least one of: an amount of time a total number of products stored in the at least one bin does not change; a number of times at least one product is binned or picked from the at least one bin, a number of products stored in the at least one bin; and an accuracy percentage of the worker at the retail sales facility during a preceding audit of the at least one bin;

storing the at least one bin audit management factor generated by the electronic inventory management device in an electronic inventory management database the electronic inventory management database being stored on a server in communication with the electronic inventory management device and the mobile electronic device of the worker at the retail sales facility;

obtaining, using the electronic inventory management device, the at least one bin audit management factor for the at least one bin from the electronic inventory management database, and determining, via the processor of the electronic inventory management device, whether at least one threshold value for the at least one bin audit management factor obtained from the electronic inventory management database meets a predetermined threshold value, stored in the electronic inventory management database, that supports auditing the at least one bin;

setting the predetermined threshold value for the number of products stored in the at least one bin based on a determination, by the processor of the electronic inventory management device, of whether the products stored in the at least one bin are stored as pallets, cases, or eaches;

generating, using the processor of the electronic inventory management device, an indication to the worker at the retail sales facility whether the determining step supports the auditing of the at least one bin; and when the determining step supports the auditing of the at least one bin, transmitting, from the electronic inventory management device, a signal to the electronic mobile device of the worker at the retail sales facility, the signal causing the electronic mobile device of the worker to notify the worker to audit the at least one bin by generating one of a visual indication on the display and an audible indication via the speaker;

when the determining step does not support the auditing of the at least one bin, transmitting, from the electronic inventory management device, a signal to the electronic mobile device of the worker at the retail sales facility, the signal restricting the worker from auditing the at least one bin by disabling the scanner of the electronic mobile device of the worker.

2. The method of claim 1, wherein the generating step further includes generating an indication to the worker at the retail sales facility that the determining step supports the auditing of the at least one bin in response to a determination that at least two threshold values for the obtained at least one bin audit management factor meet the predetermined threshold value that supports the auditing of the at least one bin.

3. The method of claim 1, wherein the generating step further includes generating an indication to the worker at the retail sales facility that the determining step supports the auditing of the at least one bin in response to a determination that at least three threshold values for the obtained at least one bin audit management factor meet the predetermined threshold value that supports the auditing of the at least one bin.

4. The method of claim 1, wherein the generating step further includes generating an indication to the worker at the retail sales facility that the determining step supports the auditing of the at least one bin in response to a determination that all threshold values for the obtained at least one bin audit management factor meet the predetermined threshold value that supports the auditing of the at least one bin.

5. The method of claim 1, wherein the generating step further includes, when the determining step supports the auditing of the at least one bin, outputting an indication to the worker that the at least one bin is to be audited, and when the determining step does not support the auditing of the at least one bin, an indication to the worker that the at least one bin is not to be audited.

6. The method of claim 1, further comprising counting a number of products stored in the at least one bin when the determining step does not support the auditing of the at least one bin.

7. The method of claim 1, further comprising adjusting the predetermined threshold value for the at least one bin audit management factors based on at least one previous auditing of the at least one bin.

8. A system for managing a number of audits of bins storing products at a stock room location of a retail sales facility, the system comprising:
a mobile electronic device of a worker, the mobile electronic device including at least one of a display, a speaker, and a scanner configured to scan identifying indicia of the products at the stock room location of the retail sales facility;
an electronic inventory management database stored on a server and being in communication with the mobile electronic device of the worker and being configured to store at least one bin audit management factor for at least one bin at the retail sales facility; and
an electronic inventory management device including a control unit having a processor, the electronic inventory management device being in communication with the electronic inventory management database and the electronic mobile device of the worker, wherein the processor of the electronic inventory management device is programmed to:
generate at least one bin audit management factor for at least one bin at the retail sales facility, wherein the at least one bin audit management factor comprises at least one of: an amount of time a total number of products stored in the at least one bin does not change; a number of times at least one product is binned or picked from the at least one bin, a number of products stored in the at least one bin; and an accuracy percentage of the worker at the retail sales facility during a preceding audit of the at least one bin;
obtain, the at least one bin audit management factor for the at least one bin from the electronic inventory management database, and determine whether at least one threshold value for the obtained at least one bin audit management factor meets a predetermined threshold value stored in the electronic inventory management database that supports auditing the at least one bin
set the predetermined threshold value for the number of products stored in the at least one bin based on a determination, by the processor, of whether the products stored in the at least one bin are stored as pallets, cases, or eaches;
generate an indication to the worker at the retail sales facility whether the determination supports the auditing of the at least one bin;
when the determination by the processor of the electronic inventory management device supports the auditing of the at least one bin, transmit a signal to the electronic mobile device of the worker, the signal configured to cause the mobile electronic device of the worker to generate one of a visual indication on the display and an audible indication via the speaker and thereby notify the worker to audit the at least one bin; and
when the determination of the processor of the electronic inventory management device does not support the auditing of the at least one bin, transmit a signal to the electronic mobile device of the worker at the retail sales facility, the signal configured to disable the scanner of the electronic mobile device of the worker and thereby restrict the worker from performing an audit of the at least one bin.

9. The system of claim 8, wherein the control unit is further configured to generate an indication to the worker at the retail sales facility that the determination supports the auditing of the at least one bin in response to a determination that at least two threshold values for the obtained at least one bin audit management factor meet the predetermined threshold value that supports the auditing of the at least one bin.

10. The system of claim 8, wherein the control unit is further configured to generate an indication to the worker at the retail sales facility that the determination supports the auditing of the at least one bin in response to a determination that at least three threshold values for the obtained at least one bin audit management factor meet the predetermined threshold value that supports the auditing of the at least one bin.

11. The system of claim 8, wherein the control unit is further configured to generate an indication to the worker at the retail sales facility that the determination supports the auditing of the at least one bin in response to a determination that all threshold values for the obtained at least one bin audit management factor meet the predetermined threshold value that supports the auditing of the at least one bin.

12. The system of claim 8, wherein the control unit is further configured to, when the determination supports the auditing of the at least one bin, output an indication to the worker that the at least one bin is to be audited, and when the determination does not support the auditing of the at least one bin, an indication to the worker that the at least one bin is not to be audited.

13. The system of claim 8, wherein the control unit is further configured to count a number of products stored in the at least one bin when the determination does not support the auditing of the at least one bin.

14. The system of claim 8, wherein the control unit is further configured to adjust the predetermined threshold value for the at least one bin audit management factors based on at least one previous audit of the at least one bin.

* * * * *